United States Patent [19]

Absil et al.

[11] Patent Number: 5,053,374

[45] Date of Patent: Oct. 1, 1991

[54] METHOD FOR PREPARING A ZEOLITE CATALYST BOUND WITH A REFRACTORY OXIDE OF LOW ACIDITY

[75] Inventors: Robert P. L. Absil, West Deptford; Philip J. Angevine, Woodbury; Joseph A. Herbst, Turnersville; Donald J. Klocke, Somerdale; John P. McWilliams, Woodbury; Scott Han, Lawrenceville; David S. Shihabi, Pennington, all of N.J.

[73] Assignee: Mobil Oil Corp., Fairfax, Va.

[21] Appl. No.: 431,002

[22] Filed: Nov. 2, 1989

Related U.S. Application Data

[63] Continuation-in-part of Ser. No. 140,357, Jan. 4, 1988, abandoned, which is a continuation-in-part of Ser. No. 44,639, May 1, 1987, abandoned.

[51] Int. Cl.$^5$ .............................................. B01J 29/04
[52] U.S. Cl. ...................................................... 502/64
[58] Field of Search ............................................ 502/64

[56] References Cited

U.S. PATENT DOCUMENTS

| | | | |
|---|---|---|---|
| 3,055,841 | 9/1962 | Gladrow et al. | 502/64 |
| 3,140,253 | 7/1964 | Plank et al. | 208/120 |
| 3,326,818 | 6/1967 | Gladrow et al. | 502/64 |
| 3,515,680 | 6/1970 | Flank | 502/64 |
| 3,518,206 | 6/1970 | Sowards et al. | 502/64 |
| 4,507,396 | 3/1985 | Hickson | 502/8 |
| 4,582,815 | 4/1986 | Bowes | 502/64 |

FOREIGN PATENT DOCUMENTS 203068 10/1983 German Democratic Rep.
974644 11/1964 United Kingdom.

*Primary Examiner*—Carl F. Dees
*Attorney, Agent, or Firm*—Alexander J. McKillop; Charles J. Speciale; Edward F. Kenehan, Jr.

[57] ABSTRACT

Low acidity refractory oxide-bound zeolite catalysts, for example, silica-bound ultrastable Y zeolite, possessing physical properties, e.g., crush strength, similar to those of their alumina-bound counterparts are described. Since low acidity refractory oxide-bound catalysts are inherently less active than alumina-bound zeolite catalysts, the former are particularly useful in hydrocarbon conversion processes in which reduced coke make increases catalyst cycle length. Due to their stability in acid environments, the low acidity refractory oxide-bound zeolite extrudate herein can be acid treated without unduly compromising its structural integrity.

28 Claims, No Drawings

METHOD FOR PREPARING A ZEOLITE CATALYST BOUND WITH A REFRACTORY OXIDE OF LOW ACIDITY

CROSS-REFERENCE TO RELATED APPLICATIONS

This application is a continuation-in-part of copending U.S. application Ser. No. 140,357, filed Jan. 4, 1988 (now abandoned), which is a continuation-in-part of U.S. application Ser. No. 044,639, filed May 1, 1987 (now abandoned).

BACKGROUND

The invention relates to a method for preparing a mechanically stable zeolite catalyst composition possessing a refractory oxide binder of low acidity, e.g., a silica binder.

The term "zeolite" as used herein designates the class of porotectosilicates, i.e., porous crystalline silicates, which contain silicon and oxygen atoms as the major components. Other framework components can be present in minor amount, usually less than about 14 mole %, and preferably less than 4%. These components include aluminum, gallium, iron, boron, etc., and combinations thereof. The crystalline aluminosilicates constitute an especially well known type of zeolite.

It is well known that extrusion is one way of obtaining a zeolite-containing material which has a high degree of strength for various applications, both catalytic and noncatalytic. Some aluminosilicate zeolites have long been used as catalysts for a wide variety of organic conversion processes. In general, aluminosilicate zeolites are incorporated with a matrix, or binder, material in order to impart mechanical stability hereto. The most commonly used matrix materials have included alumina and/or clays since these materials are fairly easy to extrude and provide extrudates of good physical strength.

It has long been recognized that silica is a desirable matrix and that it possesses advantages over alumina for some catalytic reactions. In this connection, U.S. Pat. No. 4,013,732 specifically discloses ZSM-5 with a silica matrix and U.S. Pat. Nos. 3,843,741 and 3,702,886 broadly disclose the use of ZSM-5 with a silica matrix.

U.S. Pat. No. 4,582,815 describes a method for preparing silica-rich solids said to possess improved crush strength compared to that of known silica-bound materials. The method comprises mixing silica-rich solids, preferably a mixture of silica with a zeolite such as ZSM-4 (Omega), ZSM-5, ZSM-11, ZSM-12, ZSM-23, ZSM-35, ZSM-48, Beta, X, Y, L, ferrierite, mordenite, dachiardite, clinoptilolite, offretite, erionite, gmelinite, chabazite, etc., with water and an alkali metal base such as sodium hydroxide or a basic salt such as an alkali-metal carbonate, borate, phosphate, silicate, etc., as an extrusion aid followed by mulling, extruding and subsequently drying the extrudate. It is thought that substitution of alkali metal for hydrogen in the silanol groups on the surfaces of siliceous materials such as the foregoing zeolites is responsible for their improved crush strength. The resulting extrudate is said to possess superior crush strength and sufficient integrity to withstand treatments with acids so that is is possible to steam, acid extract or calcine them. To avoid trapping the alkali metal of the extrusion aid in the extrudate, the alkali metal is ordinarily removed by exchange under acidic conditions using dilute nitric acid in 1M ammonium nitrate solution.

Silica-bound zeolite catalysts prepared in accordance with the method described in U.S. Pat. No. 4,582,815 are indicated to be useful in hydrocarbon conversions such as hydrocracking, isomerization, hydrogenation, dehydrogenation, polymerization, reforming, catalytic cracking and catalytic hydrocracking.

SUMMARY OF THE INVENTION

It has now been discovered that a low acidity refractory oxide-bound zeolite possessing excellent mechanical stability and low binder acidity making it especially useful as a catalyst for certain kinds of hydrocarbon conversions can be prepared by the method which comprises:

(a) providing a substantially homogenous mixture of zeolite, water and a low acidity refractory oxide binder containing at least an extrusion-facilitating amount of said binder in a colloidal state to provide an extrudable mass, said mixture being substantially free of added alkali metal base and/or basic salt;

(b) extruding the extrudable mass resulting from step (a) using a screw extruder; (c) drying the extrudate resulting from step (b); and, (d) calcining the dried extrudate resulting from step (c).

Drying step (c) may take place at a temperature of, e.g., at least 150° F., e.g., from 150° F. to about 500° F., for a time sufficient to dry the extrudate, e.g., for at least 1 hour. Calcining step (d) may take place in air, or other inert gas, at temperatures ranging, e.g., from about 500° F. to about 1500° F. for periods of time ranging, e.g., from about 1 to about 48 hours or more.

The calcined extrudate can be subjected to other operations such as base exchange, dealumination, steaming, impregnating with catalytically active metal(s), the details of which are well known in the art.

The extrusion process used herein involves the use of a screw extruder. Such screw extruders are also known as auger extruders or auger-type extruders. Screw extruders are distinguishable from extrusion presses, which are also termed, ram extruders. In an extrusion press or ram extruder, a mass of material which is extrudable in these particular types of extruders is forced through a die by means of a plunger or piston which may be mechanically or hydraulically operated.

By virtue of the design of an extrusion press, very large compaction forces may be generated therein. Therefore, it is possible to form an extrudate from masses which would not be extrudable under lower compacting forces by using the large compaction forces of an extrusion press. However, another inherent feature of an extrusion press results in the disadvantage that extrusions cannot be conducted in a continuous fashion. Extrudable masses can only be passed through the die one batch at a time, the piston or plunger being withdrawn from the die between batches.

Unlike extrusion presses, screw extruders can be operated in a continuous fashion. In a screw extruder, a feed is transported from a feed point to the die by means of a turning screw or auger. The feed is either introduced as an extrudable mass or is converted into an extrudable mass within the extruder with the aid of mixing action imparted by the screw. An example of a screw extruder is a 2" (5 cm) Bonnot extruder. Unlike extrusion in extrusion presses, however, high pressures cannot be generated in screw extruders. Therefore, although extrudate may be formed at a faster rate in screw extruders, by virtue of continuous operation, such screw extruders are more limited than extrusion presses insofar as feeds which may be employed therein. More particularly, masses which are only extrudable under high compaction forces are not extrudable in screw extruders. A surprising feature of the present process was the discovery of a means for forming extrudates with low acidity refractory oxide binders, such as silica, especially without using high compaction forces beyond the limits achievable by screw extruders.

A further discussion of extrusion presses, screw extruders and distinctions between these types of extruders is provided in a section entitled "Size Enlargement" in Perry's Chemical Engineer's Handbook, Fourth Edition, McGraw-Hill Book Company, 1963, pp. 8-59 to 8-64, especially at pp. 8-63 and 8-64.

Unlike alumina binders, low acidity refractory oxide binders such as silica do not interact with zeolites to increase the acid catalytic activity thereof. Consequently, zeolites can be bound with low acidity refractory oxides in accordance with the method of this invention without increasing the zeolite's intrinsic activity as might occur with an alumina binder. To the contrary, the zeolite's intrinsic catalytic activity may actually be decreased by binding the zeolite with low acidity refractory oxides, such as silica. More particularly, zeolite activity may be reduced by binding zeolites such as ZSM-5, Y, Beta, etc. with low acidity refractory oxides such as $SiO_2$ and $TiO_2$. It is believed that this reduction in activity is a result of a chemical reaction of the binder with the zeolite, whereby high acidity oxides such as alumina in the zeolite framework become replaced by low acidity refractory oxides from the binder. For example, zeolites with a silica to alumina molar ratio of 70 or less e.g., 40 or less, may become enriched with framework silicon content by binding the zeolite with silica and treating the mixture at elevated temperatures. Zeolites treated in this manner may exhibit lower exchange capacities, hexane cracking (e.g., as measured by alpha value) and toluene disproportionation activities, and shifts in x-ray diffraction patterns.

In some types of hydrocarbon conversions, e.g., hydroprocessing, reforming, catalytic cracking and catalytic hydrocracking, the use of a low-acidity refractory oxide-bound zeolites having lower levels of inherent activity than their alumina-bound counterparts can result in lower coke production and significant increases in cycle length.

When employed in the low pressure hydrocracking (LPHC) process of commonly assigned, copending U.S. patent application Ser. No. 045,639, filed May 1, 1987, now abandoned, a silica-bound, low sodium framework dealuminated zeolite Y, e.g., ultrastable Y (USY) zeolite, has been found to provide significantly better results than a comparable alumina-bound USY zeolite, the latter being exemplified for such a process in U.S. Pat. No. 4,676,887.

Since the low acidity refractory oxide-bound zeolite catalysts of the present invention are capable of maintaining their structural integrity in low pH solutions very well, the zeolite dispersed in such a binder can be treated with an acid solution to effect dealumination. This effectively results in a reduction in manufacturing costs of low acidity zeolite catalysts since extrudates are easier to handle than powders.

DESCRIPTION OF THE PREFERRED EMBODIMENTS

The method of preparing a low acidity refractory oxide-bound zeolite of this invention is not limited to any particular zeolite and in general includes all metallosilicates, particularly the aluminosilicates whether or not previously dealuminized to increase the framework silica:alumina ratio. Typical zeolites include ZSM-4 (Omega), ZSM-5; ZSM-11, ZSM-12, ZSM-20, ZSM-23, ZSM-35, ZSM-48, ZSM-50, Beta, X, Y and L as well as ferrierite, mordenite, dachiardite, clinoptiloite, offretite, erionite, gmelinite, chabazite, etc.

It is to be understood that the identification of the zeolites be resolved on the basis of their respective X-ray diffraction patterns. As is obvious, the present invention contemplates utilization of such zeolites wherein the mole ratio of silica-to-metal oxide is essentially unbounded. The zeolites are not limited to specific silica:metal oxide mole ratios, it now being known that such zeolites may be substantially metal-free and, yet, having the same crystal structure as the disclosed materials, may be useful or even preferred in some applications. It is the crystal structure, as identified by the X-ray diffraction "fingerprint", which established the identity of the specific zeolite material.

The binder material herein can be selected from among any of the low acidity refractory oxides of metals of Groups IVA and IVB of the Periodic Table of the Elements. Particularly useful are the oxides of silicon, germanium, titanium and zirconium with silica being especially preferred. Combinations of such oxides with other oxides are also useful provided that at least about 40 weight percent, and preferably at least 50 weight percent, of the total oxide is one or a combination of the aforesaid Group IV and/or Group IVB metal oxides. Thus, mixtures of oxides which can be used to provide the binder material herein include silica-alumina, silica-magnesia, silica-zirconia, silica-thoria, silica-beryllia, silica-titania, titania-zirconia, silica-alumina-thoria, silica-alumina-zirconia, silica-alumina-magnesia and silica-magnesia-zirconia.

It is an essential requirement of the method of preparing a low acidity refractory oxide-bound zeolite catalyst herein that the refractory oxide contain at least an extrusion-facilitating amount of the oxide in colloidal form. The colloidal Group IVA and or Group IVB metal oxide component of the binder can represent anywhere from about 1 to about 90 weight percent or more of the total binder. For example, in the case of silica, amounts of colloidal silica ranging from about 2 to about 60 weight percent of the total binder generally provide entirely acceptable results.

Water may be used as a dispersant. At least part of the low acidity refractory oxide may be added in dry particulate form, e.g. amorphous precipitated silica, so as to control the moisture content of the binder/zeolite/water mixture at a level to ensure satisfactory extrusion. Preferably the moisture content of the mixture does not exceed 60%, and preferably is at least 35%, by weight. No alkali metal base or basic salt is added to the mixture.

The mixture of zeolite, water and binder, which is to be extruded, may be obtained by mixing these components in the absence of added water-immiscible solvent. In this regard, U.S. Pat. No. 4,507,396, the entire disclosure of which is expressly incorporated herein by reference, discloses the mixing of various components with water-immiscible solvent to form a hydrous plastic agglomerate, followed by separating the water-immiscible solvent from the hydrous plastic agglomerate, which is, in turn, shaped and dried. The present process may take place without the use of such water-immiscible solvent as called for by U.S. Pat. No. 4,507,396.

The relative proportions of zeolite and low acidity refractory oxide binder on an anhydrous basis can vary widely with the zeolite content ranging from between about 1 to about 99 weight percent, e.g., in the range of from about 5 to about 80 weight percent, of the dry composite.

Extrudates of 1/16 inch obtained in accordance with this invention may have a crush strength of from 5 to 24 pounds when the crushing force is applied over a ¼ inch length. Crush strengths range from 40 to 192 lb/linear inch. In addition, the low acidity refractory oxide-bound extrudates of this invention (not 100% zeolite) are also characterized by a high porosity, i.e., between 0.43 to about 1 cc/gram (measured by mercury porosimeter and helium absorption).

The extrudates of this invention can find utility in a wide variety of processes which are both catalytic and noncatalytic. Quite obviously, the materials can be used absorbents. Additionally, the materials can be used as catalysts for a wide variety of organic conversions. As is known in the art, a low acidity refractory oxide such as silica has low catalytic activity such that incorporation of a zeolite in the silica leads to some unusual effects. The low acidity refractory oxide can be used as a support for a catalytic material, e.g., a hydrogenation component such as platinum, palladium, cobalt, molybdenum, iron, tungsten, nickel or mixtures of the same. The catalytic metals in the form of their oxides or salts can also be added to the low acidity refractory oxide during the mulling step with pH adjustment, if necessary, to stabilize the colloidal oxide component of the mixture. In addition, the low acidity refractory oxide-bound zeolite extrudates find utility in hydrocracking, isomerization, hydrogenation, dehydrogenation, polymerization, reforming, catalytic cracking, catalytic hydrocracking, toluene disproportionation, and the like. Thus, the extrudates of this invention can be used with or without added active metal components for catalytic cracking, isomerization, alkylation, reforming and hydrogenative conversions such as hydrocracking, hydrogenation and hydrofining, e.g., desulfurization and denitrogenation. Catalytic cracking conditions usually include temperatures of at least 600° F., generally 750° F.–1100° F., and pressures between atmospheric and 200 psig. Hydrogenative conversions can be accomplished at various conditions depending on the feedstock characteristics and the desired degree of conversion. Hydrogenation can be effected at pressures of about 500 psig and at temperatures of from 200° to 1000° F., usually 600° to 900° F. Hydrogen is added at rates of at least about 500 standard cubic feet per barrel, usually 1000 to 20,000 SCF/BBL.

The original cations associated with each of the zeolites utilized herein can be replaced by a wide variety of other cations employing techniques well known in the art. Typical replacing cations including hydronium, ammonium, alkyl ammonium and metal cations. Suitable metal cations include metals such as rare earth metals, as well as metals of Groups IIA and B of the Periodic Table, e.g., zinc, and Group VIII of the Periodic Table, e.g., platinum and palladium.

Typical ion-exchange techniques call for contacting the selected zeolite with a salt of the desired replacing cation. Although a wide variety of salts can be employed, particular preference is given to chloride, nitrates and sulfates. Representative ion-exchange techniques are disclosed in a wide variety of patents including U.S. Pat. Nos. 3,140,249; 3,140,251; and 3,140,253.

Following contact with a solution of the desired replacing cation, the zeolite is then preferably washed with water and dried at a temperature ranging from about 150° to about 600° F. and thereafter calcined in air, or other inert gas, at temperatures ranging from about 500° to about 1500° F. for periods of time ranging from about 1 to about 48 hours or more. Catalysts of improved selectivity and other beneficial properties can be obtained by subjecting the zeolite to treatment with steam at elevated temperatures ranging from about 500° C. to about 1200° F. and preferably from about 750° F. to about 1000° F. The treatment can be accomplished in an atmosphere of 100% steam or in an atmosphere consisting of steam or ammonia and some other gas which is essentially inert to the zeolites. A similar treatment can be accomplished at lower temperatures and elevated pressure, e.g., from about 350° to about 700° F. at from about 10 to about 200 atmospheres.

If so desired, the catalyst can be treated with reagents prior to steaming and with organics still contained to remove alumina from the outside surface, or calcined in air or inert atmosphere to remove the organics and then ion exchanged to the ammonium form or other desired metal exchanged form. It is a special attribute herein that it has sufficient integrity to withstand treatment with acids so that it is possible to extrude an aluminosilicate zeolite such as zeolite Y and steam, acid extract, calcine or effect combinations thereof to produce a stable high silica-to-alumina Y in an easily handled form. Processes for dealuminizing Y are well known in the art, i.e., see Rabo, *Zeolite Chemistry and Catalysis*, ACS Monograph 171(1976) Chapter 4, the entire disclosure being incorporated by reference herein.

The calcined, ammonium exchanged extrudate is steamed at an appropriate temperature to initially reduce the catalyst activity by removing tetrahedral aluminum ions from the zeolite framework. The steamed catalyst is subsequently contacted with a 1N $HNO_3$ solution in a static system at a temperature ranging from 55° C. to 85° C. for a certain period of time, typically 4 hours. Depending on the quantity of a 1N $HNO_3$ solution used, additional treatments may be required to reduce the catalyst activity further.

When Alpha Value is referred to herein, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 $sec^{-1}$). Alpha Tests are described in U.S. Pat. No. 3,354,078 and in *The Journal of Catalysis*, Vol. IV, pp. 522–529 (August 1965), each incorporated herein by reference as to that description. Alpha tests are also described in *J. Catalysis*, 6, 278 (1966) and *J. Catalysis*, 61, 395 (1980), each also incorporated herein by reference as to that description.

EXAMPLE 1

This example illustrates the preparation of an alumina-bound USY catalyst to provide a basis for comparison with silica-bound USY catalysts prepared in accordance with the method of this invention (Examples 2-6). On a dry basis, 65 weight parts of USY zeolite (Z-14US, W. R. Grace) were intimately admixed with 35 weight parts finely divided alpha alumina monohydrate (Kaiser SA) and an extrudable mass was obtained by mulling. The moisture content of the mix was adjusted to 46-48 weight percent by addition of deionized water. After additional mulling, the resulting paste was extruded using a 2" Bonnot extruder to yield 1/16" diameter extrudate. The extrudates were subsequently dried at 250° F. for typically 18 hours in air and then calcined at 1000° F. for 3 hours in air flowing at 3 or 5 v/v/min. Heating rates of 3 or 5° F./min were used.

EXAMPLES 2-6

In the case of silica-bound USY, 65 wt. parts of the zeolite in the form of a powder was mixed with 35 weight parts of (dry basis) of silica consisting of various ratios of an amorphous precipitated silica (PPG Industries HiSil 233 EP) and colloidal silica; a homogenous mix was obtained by mulling. The moisture content of the mix was adjusted to 42-47 weight percent with deionized water. The mix was extruded using a 2" Bonnot extruder to yield 1/16" diameter extrudate. The extrudate was treated substantially the same as described in Example 1. Since the alpha activity of the bound USY extrudate (as measured by the alpha test) was less than 10, the extrudate was ammonium exchanged to remove sodium employing a three step ammonium exchange/calcination procedure. After ammonium exchanging at room temperature for 1 hour with 5 ml/g circulating 1N ammonium nitrate, the extrudate was washed and dried at 250° F. in air and subsequently calcined at 1000° F. for 3 hours in dry flowing air. This procedure was repeated three times so that the acidity of the catalyst (as measured by the alpha test) increased to a level of 250 to 300 and sodium content was reduced from 1.8-1.9 to 0.1-0.2 %. The calcinations were performed in a relatively anhydrous environment to preclude any significant steaming of the catalyst.

To evaluate the effect of colloidal silica content on the physical properties of the zeolite, the amount of colloidal silica in the extrusion mix was changed such that the colloidal silica content (on a dry basis) varied from 17.5 weight percent to 2.2 weight percent. Additional amorphous precipitated silica was added to maintain a 65/35 zeolite/binder weight ratio (on a dry basis). The physical properties of the alumina and silica bound catalysts are set forth in Table 1. While two commercial sources of colloidal silica were used, a clear correlation is observed between crush strength and colloidal silica content demonstrating the critical role of colloidal silica as a binding agent.

TABLE 1

Properties of Bound USY Catalysts

| Example | 1 | 2 | 3 | 4 | 5 | 6 |
|---|---|---|---|---|---|---|
| Wt. % Amorphous precipitated Silica | 0.0 | 17.5 | 26.2 | 30.6 | 30.6 | 32.8 |
| Wt. % Colloidal Silica | 0.0 | 17.5 | 8.8 | 4.4 | 4.4 | 2.2 |
| Colloidal Silica Source | (Alumina-bound) | EM Science | EM Science | EM Science | Ludox, HS-30 | Ludox, HS-30 |
| Sodium Content, ppm | 870 | 1170 | 945 | 1580 | 1580 | 1650 |
| Alpha Activity | 300 | 266 | 255 | 279 | 321 | 263 |
| Unit Cell Size, Angstroms | 24.52 | 24.51 | 24.52 | ND | 24.61 | 24.56 |
| Density, g/cc | | | | | | |
| Real | 2.73 | 2.38 | 2.35 | 2.32 | 2.35 | 2.33 |
| Particle | 0.94 | 0.89 | 0.90 | 0.84 | 0.84 | 0.84 |
| Surface Area, $M_2/g$ | 476 | 439 | 409 | 434 | 413 | 430 |
| Pore Volume, cc/g | 0.70 | 0.70 | 0.68 | 0.68 | 0.76 | 0.77 |
| Avg. Pore Diameter, A | 59 | 64 | 67 | 63 | 74 | 71 |
| PSD, % of Pores with | | | | | | |
| 0-30 A Diameter | 36 | 33 | 33 | 32 | 33 | 27 |
| 30-50 | 7 | 4 | 3 | 2 | 1 | 2 |
| 50-80 | 10 | 4 | 4 | 4 | 3 | 3 |
| 80-100 | 6 | | 3 | 3 | 2 | 2 |
| 100-150 | 9 | 8 | 7 | 7 | 6 | 5 |
| 200-300 | 2 | 9 | 13 | 15 | 15 | 15 |
| 300+ | 27 | 32 | 29 | 28 | 33 | 39 |
| Crush Strength (lb/in) | 65 | 84 | 77 | 71 | 87 | 53 |

These data demonstrate that the physical properties of silica-bound USY are about equal to those of alumina-bound USY.

EXAMPLES 7-9

65 Weight percent zeolite beta (on a dry basis) in the form of a powder was mixed with 35 wt parts of combined amorphous precipitated silica (HiSil 233 EP) and colloidal silica; a homogenous mix was obtained by mulling. To facilitate admixture, the moisture content of the mix was adjusted to 45-49 weight percent by adjusting the amount of deionized water added. Two different amounts of colloidal $SiO_2$ were added to obtain extrudable mixes while maintaining a 65/35 zeolite/binder weight ratio. The resulting mixes were extruded to yield 1/16" diameter extrudate. The extrudate was dried at 250° F. for 18 hours and were subsequently calcined at 1000° F. for 3 hours in Nitrogen flowing at 3 or 5 v/v/min. This was followed by a 3 hour calcination at 1000° F. in air flowing at 3 or 5 v/v/min. Next, the extrudate was exchanged two times at room temperature for 1 hour with a 5 ml/g circulating 1N ammonium nitrate solution. After washing the extrudate was then calcined at 1000° F. for 3 hours in air flowing at 3 or 5 v/v/min. Heating rates of 3° or 5° F. were typically employed.

For purposes of comparison, the physical properties of the foregoing extrudate (Examples 8 and 9) were compared with those of a commercially available alumina-bound zeolite Beta (Example 7).

The physical property data are set forth in Table II as follows:

TABLE 2

| Physical Properties of Bound Beta Catalysts | | | |
|---|---|---|---|
| Example | 7 | 8 | 9 |
| Wt. % Amorphous Precipitated Silica | 0 | 17.5 | 26.2 |
| Wt. % Collodial Silica (HS-30) | 0 | 17.5 | 8.8 |
| Sodium Content, ppm | ND | 765 | 670 |
| Alpha Activity | 325 | 344 | 342 |
| Density, g/cc | | | |
| Packed | 0.50 | ND | 0.52 |
| Real | 2.58 | 2.33 | 2.34 |
| Particle | 0.89 | 0.87 | 0.82 |
| Surface Area, m²/g | 480 | 421 | 428 |
| Pore Volume, cc/g | 0.74 | 0.71 | 0.80 |
| Avg. Pore Diameter, Angstroms | 61 | 68 | 75 |
| Crush Strength (lb/inch) | 74 | 86 | 38 |

The foregoing data clearly show the effects of the colloidal silica as binding agent. The physical properties of the silica-bound zeolite Beta catalyst are similar to those of the alumina-bound zeolite Beta.

EXAMPLES 10 to 12

Silica-bound ZSM-5 extrudates (Examples 11 and 12) were prepared substantially as described in Examples 8 and 9. The physical properties of the silica-bound ZSM-5 extrudates and those of a commercial alumina-bound ZSM-5 extrudate (Example 10) are set forth in Table 3 as follows:

TABLE 3

| Physical Properties of Bound ZSM-5 Catalysts | | | |
|---|---|---|---|
| Example | 10 | 11 | 12 |
| Wt. % Amorphous precipitated silica | 0 | 17.5 | 26.2 |
| Wt. % Colloidal Silica (HS-30) | 0 | 17.5 | 8.8 |
| Sodium Content, ppm | 415 | 56 | 75 |
| Alpha Activity | about 220 | 168 | 155 |
| Density, g/cc | | | |
| Real | 2.63 | 2.30 | 2.31 |
| Particle | 0.91 | 0.96 | 0.87 |
| Surface Area, m²/g | 338 | 283 | 287 |
| Pore Volume, cc/g | 0.71 | 0.60 | 0.72 |
| Avg. Pore Diameter, Angstroms | 84 | 85 | 101 |
| Crush Strength (lb/inch) | — | 64 | 31 |

These data clearly show the role of colloidal silica on the crush strength of silica-bound ZSM-5 extrudates.

EXAMPLES 13-17

Previous examples demonstrate that silica-bound catalysts prepared by the extrusion method of this invention retain their structural integrity upon calcination and ammonium exchange. An important advantage of silica-bound zeolite catalysts is that the extrudates can be acid treated without losing their structural integrity. Thus, the silica-bound USY catalyst of Example 3 was steamed for 10 hours at 1000° F. to reduce the alpha activity from 255 to 50–60 and to reduce the unit cell size from 24.52 to 24.35 Angstroms. The steamed extrudate (Example 13) was then treated for 4 hours in a 1N HNO₃ solution at 55° C. or 85° C. (Examples 14–17). As a result of the acid treatment, the alpha activity was reduced to 6 and the unit cell size was reduced to 24.25 Angstroms as determined by x-ray analysis. Good crystallinity was retained (greater than about 50%). More importantly, however, equivalent crush strengths were obtained before and after steaming and acid treatment (77 and 82 lb/inch, respectively). The foregoing data are summarized in Table 4 as follows:

TABLE 4

| Physical Properties of Acid Treated SiO₂-Bound USY Catalysts | | | | | | |
|---|---|---|---|---|---|---|
| Example | 3 | 13 | 14 | 15 | 16 | 17 |
| HNO₃ concentration | — | — | 1N | 1N | 1N | 1N | 1N | 1N |
| Treatment Temp., °C. | — | — | 55 | 55 | 85 | 85 | 85 | 85 |
| Treatment Time, Hrs. | — | — | 4 | 4 | 4 | 4 | 4 | 4 |
| ml of HNO₃/g Cat. | — | — | 5 | 10 | 5 | 10 | 15 | 20 |
| Unit Cell Size, A | 24.52 | 24.36 | 24.30 | 24.27 | 24.35 | 24.26 | 24.25 | 24.28 |
| Crystallinity, % | ND | 65 | 65 | ND | 60 | 55 | 55 | 55 |
| Alpha Activity | 255 | 52 | 76 | 6 | 83 | 6 | 6 | 5 |
| Crush Strength lb/in | 77 | ND | ND | 81 | ND | 74 | 82 | 56 |
| Na, wt. % | (.11) | 0.11 | 0.05 | 0.01 | 0.04 | 0.01 | 0.05 | 0.08 |
| SiO₂, wt. % | (83.3) | 83.3 | ND | 97.2 | 95.4 | 97.2 | 97.2 | 97.2 |
| Al₂O₃, wt. % | (13.6) | 13.6 | ND | 2.8 | 6.6 | 2.1 | 2.3 | 2.2 |
| Ash, wt. % | (97.6) | 97.6 | 98.5 | 98.9 | 98.7 | 98.9 | 98.7 | 98.9 |
| Surface Area, m²/g | 409 | — | — | 482 | — | 480 | 488 | 495 |

EXAMPLE 18

A sodium exchanged zeolite Y (NaY) was extruded with silica in a 65/35 zeolite binder ratio. This extrudate was prepared by mixing, on a dry basis, 65 weight parts of NaY with 17.5 weight parts amorphous precipitated silica (HiSil 233 EP) and 17.5 weight parts of colloidal silica (HS-30). After mulling and water addition as appropriate, the resulting homogenous mixture paste was extruded to 1/16" diameter extrudate. The extrudate was dried at 250° F. 1 gram of this catalyst was calcined at 538° C. for four hours under high nitrogen purge such that in-situ steaming of the material was avoided. The calcined silica bound catalyst was analyzed by x-ray diffraction along with the uncalcined silica bound catalyst.

X-ray diffraction data was collected at the Brookhaven National Laboratory, National Synchrotron Light Source on the X13A powder diffractometer. The diffractometer employs parallel beam geometry with a Ge(111) incident beam monochromater and a Ge(220) analyzer crystal. Data was obtained with a 2-theta step scan of 0.01 degrees, 2 second count times per step, a theta scan of 2 degrees per step, and an x-ray wavelength of 1.3208 Angstroms. The 2-theta zero and x-ray wavelength were calibrated with a National Bureau of Standards silicon metal standard. D-spacings were obtained from the measured data with a second derivative peak search algorithm. The lattice parameters were refined with a standard least-squares refinement program.

For both samples, the expected orthorhombic unit cells were obtained. The $a_o$ values obtained as well as the calculated estimated standard deviations (esd) were:

|  | $a_o$ | esd |
| --- | --- | --- |
| Uncalcined Catalyst | 24.6611 | 0.0005 |
| Calcined Catalyst | 24.6568 | 0.0006 |

The difference between the two $a_o$ values is 0.0043 whereas the sigma 1, calculated from the esd's, equals 0.0008. On statistical grounds, the limit of significance between the two unit cells is 5.51 sigma. From a normal distribution chart, at significance levels of greater than 3.89 sigma the probability is less than 0.0001 that two equal unit cells would be found to differ to by 0.0043 Angstroms. This establishes the level of confidence at greater than 99.9999% that the two unit cells are statistically different. The calcined silica extrudate shows the unit cell contraction consistent with silica insertion into the framework of the zeolite in place of framework alumina.

EXAMPLE 19

To show the importance of controlling the moisture content of the extrudable mass, a zeolite beta/silica mix was prepared with a 65/35 weight ratio as in examples 8 and 9 but using only colloidal silica as the low acidity, refractory oxide source. Thus, to 397.3 g of zeolite beta crystals (ash content 75.5%), 538.5 g of colloidal silica (Ludox HS-30) were gradually added and mulled. However, the resulting paste was too wet (moisture content 50.7%) to be extruded.

EXAMPLE 20

The process of Example 19 was repeated but with ratio of the zeolite beta (ash content 75.5%) to colloidal silica (ash content 30%) increased to 82.5/17.5 to produce mixtures in which the moisture content was at a level suitable for extrusion. The results are shown in Table 5 below:

TABLE 5

| PHYSICAL PROPERTIES OF SILICA-BOUND ZEOLITE BETA | | | |
| --- | --- | --- | --- |
| Zeolite content, wt. % |  | 82.5 |  |
| Silica content (Ludox), wt. % |  | 17.5 |  |
| Moisture content (actual), wt. % | 46.5 | 44.6[1] | 43.6 |
| Solids content (actual), wt. % | 53.5 | 55.4[1] | 56.4 |
| Solids content (target), wt. % | 53.0 | 55.0 | 56.0 |
| Crush strength, lb/inch | 68 | 76 | 70 |
| kg/m | 1214 | 1357 | 1250 |
| Density, g/cc |  |  |  |
| Particle | 0.89 | 0.91 | 0.92 |
| Real | 2.34 | 2.34 | 2.36 |
| Surface area, m2/g | 513 | 503 | 508 |
| Pore volume, cc/g | 0.70 | 0.67 | 0.67 |

[1]Estimated from target moisture content.

What is claimed is:

1. A method for preparing a low acidity refractory oxide-bound zeolite catalyst which comprises:
   a) providing a substantially homogenous mixture of zeolite, water and a low acidity refractory oxide binder containing at least a extrusion-facilitating amount of said binder in a colloidal state to provide an extrudable mass, said mixture being substantially free of added alkali metal base and/or basic salt;
   b) extruding the extrudable mass resulting from step (a) using a screw extruder;
   c) drying the extrudate resulting from step (b); and,
   d) calcining the dried extrudate resulting from step (c).

2. The method of claim 1 where the low acidity refractory oxide is silica.

3. The method of claim 1 wherein the zeolite component is a medium pore zeolite.

4. The method of claim 1 wherein the zeolite component is ZSM-5, ZSM-22, ZSM-23, ZSM-35, and ZSM-45.

5. The method of claim 1 wherein the zeolite component is a large pore zeolite.

6. The method of claim 1 wherein the zeolite component is selected from the group consisting of zeolite Y, zeolite Beta, ZSM-4, ZSM-12, ZSM-20 and mordenite.

7. The method of claim 1 wherein colloidal silica represents from about 1 to about 90 precent of the total binder.

8. The method of claim 1 wherein collodial silica represents from about 2 to about 80 weight percent of the total binder.

9. The method of claim 1 which further comprises ion-exchanging the dried zeolite extrudate.

10. The method of claim 9 which further comprises calcining the ion-exchanged zeolite extrudate.

11. The method of claim 1 which further comprises incorporating a catalytically active metal in the zeolite.

12. The method of claim 1 which further comprises steaming the calcined catalyst extrudate.

13. The method of claim 12 which further comprises acid-treating the steamed catalyst extrudate to an alpha value not exceeding about 10.

14. The method of claim 1 which further comprises treating the extrudate by ion-exchange, steaming, acid treating or a combination of these operations to provide a stable extrudate.

15. The low acidity refractory oxide-bound zeolite catalyst resulting from the method of claim 1.

16. The method of claim 2 wherein the zeolite has a silica to alumina molar ratio of 70 or less.

17. The method of claim 16 wherein the zeolite is a sodium exchanged zeolite Y and wherein said calcining step (d) takes place under nitrogen purge.

18. The method of claim 1 wherein the moisture content of the extrudable mass does not exceed 60% by weight.

19. The method of claim 1 wherein the moisture content of the extrudable mass is 35–60% by weight.

20. The method of claim 1 where said homogeneous mixture of step (a) is obtained by mixing the zeolite, water and binder in the absence of added water-immiscible solvent.

21. The method of claim 1 wherein the calcined extrudate of step (d) is treated with an acid solution to effect dealumination of the zeolite.

22. The method of claim 1 wherein the calcined extrudate of step (d) is steamed and then contacted with a nitric acid solution to effect dealumination of the zeolite.

23. A method for preparing a low acidity refractory oxide-bound zeolite catalyst which comprises:
   a) continuously providing a substantially homogenous mixture of zeolite, water and a low acidity refractory oxide binder containing at least a extrusion-facilitating amount of said binder in a colloidal state to provide an extrudable mass, said mixture being substantially free of added alkali metal base and/or basic salt, said zeolite containing alkali metal cations capable of being ion exchanged;
b) continuously extruding the extrudable mass resulting from step (a) using a screw extruder;
c) drying the extrudate resulting from step (b);
d) calcining the dried extrudate resulting from step (c); and
e) ion exchanging said alkali metal cations.

24. The method of claim 23 wherein said alkali metal cations are exchanged with ammonium ions in step (e).

25. The method of claim 23 wherein said alkali metal cations are sodium ions.

26. The method of claim 24 wherein, after the exchange with ammonium ions, the extrudate is steamed and contacted with an acid solution to effect dealumination.

27. The method of claim 26 wherein said zeolite is zeolite Y.

28. The method of claim 27 wherein said acid solution is a nitric acid solution.

* * * * *